United States Patent
Kilgore et al.

[15] 3,697,791
[45] Oct. 10, 1972

[54] ROTOR FOR DYNAMOELECTRIC MACHINES

[72] Inventors: Lee A. Kilgore, Export; Nabeel A. Demerdash, East Pittsburgh, both of Pa.

[73] Assignee: Westinghouse Electric Corporation, Pittsburgh, Pa.

[22] Filed: Aug. 19, 1971

[21] Appl. No.: 173,005

[52] U.S. Cl. .................310/111, 310/180, 310/262
[51] Int. Cl. ............................................H02k 39/00
[58] Field of Search.......310/111, 179, 180, 187, 262

[56] References Cited
UNITED STATES PATENTS 2,679,605   5/1954   Kilgore......................310/111

*Primary Examiner*—D. X. Sliney
*Attorney*—A. T. Stratton et al.

[57] ABSTRACT

A rotor, especially for large turbine generators, which is adapted to reduce excess stator copper losses due to radial fluxes cutting the stator conductor strands. The rotor is of asymmetrical construction with a wide tooth on the trailing side of each pole face to reduce saturation effects in the stator teeth and thus minimize the radial flux and resulting copper losses in the stator.

3 Claims, 2 Drawing Figures

ROTOR FOR DYNAMOELECTRIC MACHINES

BACKGROUND OF THE INVENTION

The present invention relates to rotors for synchronous dynamoelectric machines, and more particularly to rotors for large turbine generators designed to minimize excessive copper losses in the stator conductors. Rotors for large turbine generators have either two poles or four poles and are cylindrical members with longitudinal slots for receiving distributed field windings. Saturation effects in such rotors and the resulting distortion of the air gap flux form can cause extra copper losses in the stator conductors due to rapid changes of the cross slot flux cutting such conductors. It has been proposed in Kilgore U.S. Pat. No. 2,679,605 to reduce such losses by an asymmetrical rotor design in which certain teeth of the rotor on the trailing side of each pole face are made wider than the remaining teeth in order to reduce the saturation effect and improve the field flux pattern.

Such an arrangement can be effective in causing some reduction in the stator losses, but further studies have shown that the most serious factor in causing the excessive stator copper losses is the radial flux which cuts the wide copper strands of the stator coils. This radial flux is caused by simultaneous saturation of adjacent stator teeth which forces the flux into a radial path in the slot between the teeth, and rapid change of this radial flux results in relatively high eddy currents and excessive heating and losses in the conductor strands.

SUMMARY OF THE INVENTION

The present invention provides an asymmetrical rotor construction which results in a substantial reduction in the radial flux linking the stator conductors and thus a marked reduction in the excess stator copper losses due to such flux. This result is accomplished by displacing the first slot on the trailing side of each pole face of the rotor away from its normal symmetrical position toward the center of the pole face. The width of the first tooth on the trailing side is thus correspondingly increased and is made at least twice the slot pitch of the remaining slots of the rotor and may be considerably greater. Preferably, the width of this first tooth on the trailing side of the pole face is approximately equal to two stator slot pitches, although this exact relation is not essential and some range of width is permissible. This construction of the rotor results in flux patterns such that adjacent teeth of the stator are not simultaneously saturated, and thus causes a marked reduction in the radial flux linking the stator conductors with a corresponding reduction in the losses in the stator.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
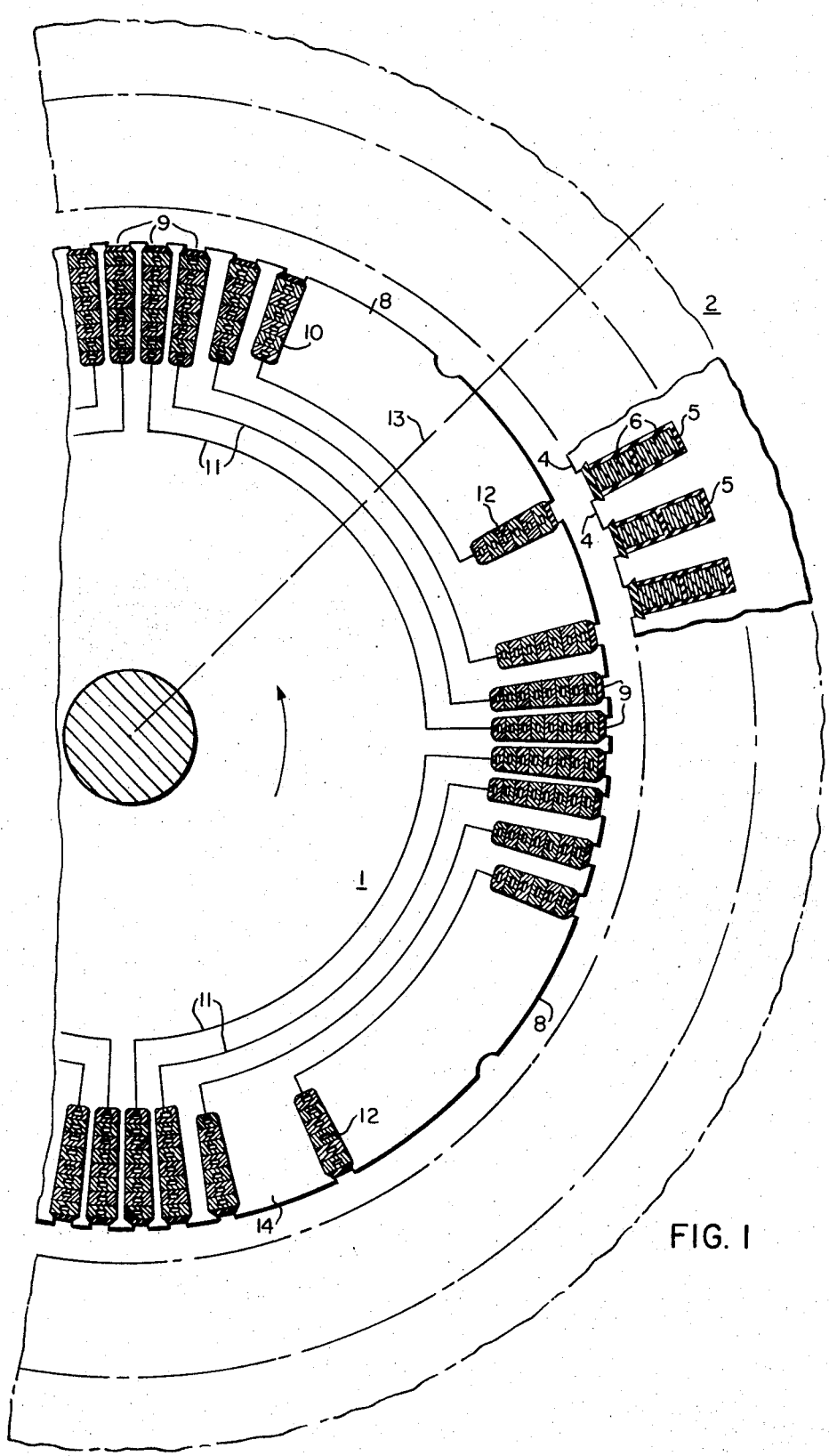
FIG. 1 is a partial transverse sectional view of a rotor embodying the invention with a portion of the cooperating stator member.

An illustrative embodiment of the invention is shown in FIG. 1 which shows a portion of a rotor 1 and a cooperating stator member 2, only those parts of the rotor and stator necessary to an understanding of the invention being shown. The stator member 2 may be of any usual or desired construction including a laminated stator core 3 with equally spaced longitudinal teeth 4 forming slots 5 between them. An armature winding of any suitable type is placed in the slots 5 of the stator in the usual manner. As shown, the winding may consist of stranded stator conductors 6 arranged in suitably connected coils and disposed in the slots 5. It will be understood that in machines of the size for which the present invention is primarily intended the stator winding will normally include suitable cooling means, such as ducts for the circulation of a coolant fluid which may be separate cooling ducts or hollow strands of the conductors themselves. Such known cooling means have been omitted to avoid unnecessary complication of the drawing.

The rotor 1 is shown as a four pole rotor although it will be apparent that the invention may be applied to two pole rotors if desired. The rotor 1 is of the usual cylindrical construction with a plurality of longitudinal teeth forming longitudinal slots between them. The slots are arranged in general in the usual manner in groups on opposite sides of unslotted pole face regions 8. In the illustrated embodiment, four slots 9 are provided on each side of each pole face 8 for reception of the concentric coils of a distributed field winding. Each coil consists of a suitable number of turns of conductors 10, which may have central ducts for coolant fluid, and which are disposed in corresponding slots on opposite sides of the pole face 8 and connected to form concentric coils, the end connections between the coil sides being indicated diagrammatically at 11. It will be understood that any suitable type or arrangement of field winding may be utilized.

In accordance with the present invention, the rotor has an asymmetrical construction. The first slot 12 on the trailing side of each pole face 8 is displaced from a symmetrical position toward the center of the pole face, indicated at 13, the direction of rotation of the rotor being indicated by the arrow. The first tooth 14 on the trailing side is thus correspondingly increased in width relative to the width of the remaining teeth, or to its width in a symmetrical arrangement, and the width of the first tooth 14 is made greater than twice the minimum slot pitch of the remaining rotor slots, the slot pitch being defined as the distance between corresponding points in adjacent slots. The width of the tooth 14 should not be less than twice the minimum rotor slot pitch and may be considerably more, the width of the tooth 14 in the illustrated embodiment at the surface of the rotor being about two and one-half times the minimum slot pitch. The remaining rotor slots and teeth may be symmetrically disposed about the pole face center 13 and, if desired, certain of the teeth may be made thicker than others to reduce saturation effects in accordance with the above mentioned Kilgore patent.

The effect of this construction in reducing excess stator copper losses may be explained by reference to the curves of FIG. 2. As previously stated, the stator losses in question are caused by radial flux linking the wide strands of the stator conductors 6. This radial flux is primarily due to simultaneous saturation of adjacent stator teeth 4 which forces air gap flux to link the conductors 6 in a radial direction. Rapid changes of this radial flux induce high circulating currents in the stator conductors with correspondingly high losses and heating.

Figure 2:
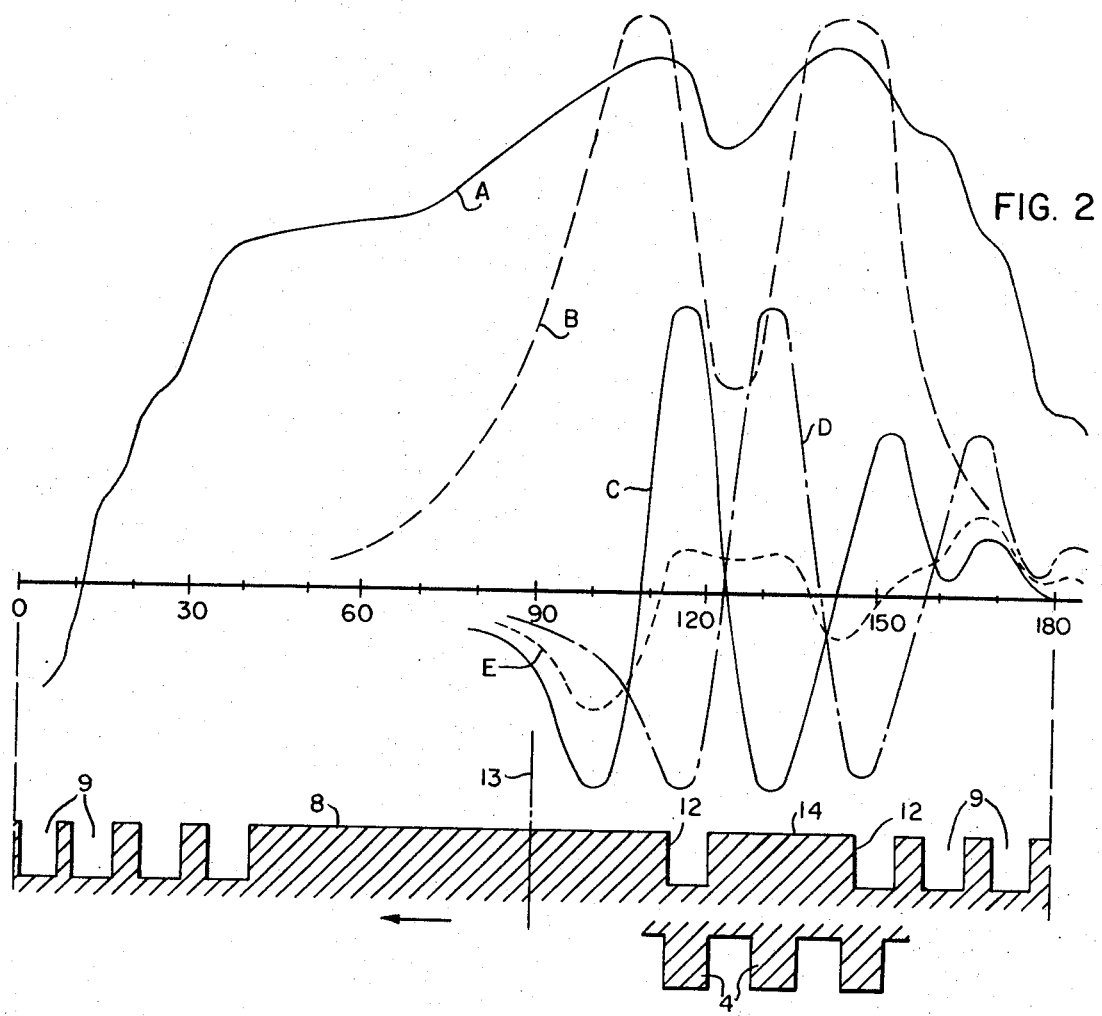
FIG. 2 is a set of curves illustrating the effect of the invention.

In FIG. 2, the curve A shows the air gap flux density produced by one pole of the rotor construction of FIG. 1, the rotor teeth and the slots 9 and 12 being diagrammatically indicated to show their relation to the flux pattern. The asymmetrical construction of the rotor tends to reduce the peak flux density adjacent the trailing edge of the pole face 8 and the wide rotor tooth 14 also causes a second peak adjacent the trailing edge of the tooth 14, as clearly shown by the curve A.

The stator losses due to the radial flux are caused by the circulating currents or eddy currents induced by such flux in the stator conductors, and these currents are of course proportional to the rate of change of the radial flux. The flux linking the stator windings 6 can be plotted as shown in FIG. 2. The magnetomotive force in the stator teeth changes more rapidly than the flux density since the magnetomotive force varies approximately as the sixth to the eighth power of the air gap flux density. The curve B of FIG. 2 shows the stator tooth magnetomotive force, and it will be seen that this curve is steeper than the flux density curve A but has peaks coinciding with the peaks of the air gap flux density curve A. The magnetomotive force represented by curve B results in saturation of the stator teeth and is responsible for the radial flux previously described. The rate of change of the magnetomotive force is a measure of the induced currents in the stator conductors and therefore of the losses which are proportional to the square of these currents.

Curve C of FIG. 2 is a plot of the slope of curve B and therefore shows the rate of change of the magnetomotive force in one stator tooth as the rotor moves past it. It will be seen that this is a periodic curve with a period equal to the pitch of the wide rotor tooth 14. The rate of change of flux in the next adjacent stator tooth will be shown by an exactly similar curve displaced from curve C by a distance equal to one stator slot pitch. This is shown by the curve D of FIG. 2, several stator teeth 4 being also shown diagrammatically to illustrate the relations of the curves to the tooth positions and the slot pitch. The currents induced in the conductors in the stator slot lying between the two adjacent teeth corresponding to curves C and D can be determined by adding the rates of change of flux in the two teeth. Curve E of FIG. 2 is obtained by adding curves C and D and thus represents the stator circulating currents which cause the excess losses. In the preferred embodiment of the invention shown, the stator slot pitch is one-half the rotor slot pitch corresponding to the wide rotor tooth 14. With this relation, as can be clearly seen in FIG. 2, the curves C and D tend to cancel and the magnitude of the resultant curve E is relatively low. The stator losses are therefore minimized.

If the wide rotor tooth 14 is designed to be equal to substantially two stator slot pitches, as well as being more than twice the width of the minimum rotor slot pitch, the relations illustrated in FIG. 2 and described above will obtain. That is, the peaks of the curves C and D will be half as far apart as the peaks of the air gap flux density curve A, and the curves C and D will tend to cancel giving a minimum resultant curve E. This effect may be visualized by considering that the curves C and D show that only one of two adjacent stator teeth will be saturated at a time, so that the flux is not forced into a radial pattern in the slot, or at least such radial flux is greatly reduced as compared to the flux obtained from a conventional rotor. Since the radial flux is thus greatly reduced, the circulating currents caused by rapid changes in the flux are also greatly reduced with corresponding reduction in heating and losses in the stator winding.

A preferred embodiment of the invention has been described for the purpose of illustration, but it will be apparent that various modifications may be made. Thus the width of the wide rotor tooth 14 should be not less than twice the pitch of the remaining rotor slots but it may be considerably more if desired. In general, an increase of the width of this tooth tends to increase the net excitation required but somewhat reduces the peak air gap flux density. A decrease in the width of the tooth 14 tends to reduce the required excitation but somewhat increases the peak flux density. The most desirable width therefore is a matter of design and is further determined by its relation to the stator slot pitch. As explained above, the width of the wide rotor tooth 14 should be approximately twice the stator slot pitch. This is not an absolute requirement, however, as rotors may in some cases have to be designed so that the same design can be used with different stator slot combinations and some compromise may be necessary. In general the rotor slot pitch corresponding to the wide rotor tooth 14 should be in the range between 0.7 and 1.7 times two stator slot pitches, or equal to from 1.4 to 3.4 stator slot pitches. Within this range reasonably satisfactory performance can be obtained although for minimum stator losses the relations explained above are preferable.

It will now be apparent that an asymmetrical rotor construction has been provided which results in a substantial decrease in stator copper losses. A particular embodiment of the invention has been shown and described for the purpose of illustration but it will be understood that various modifications and other embodiments are possible and are within the scope of the invention.

What we claim is:

1. A dynamoelectric machine having a stator member and a rotor member, said stator member having longitudinal slots for the reception of armature windings, said rotor member being a cylindrical member having longitudinal teeth forming slots for reception of a distributed field winding, said rotor slots being disposed on opposite sides of unslotted pole face regions to receive concentric coils of said field winding, the first slot on the trailing side of each pile face being displaced from a symmetrical position toward the center of the pole face such that the width of the first tooth on the trailing side is not less than twice the minimum slot pitch of the remaining slots.

2. A dynamoelectric machine as defined in claim 1 in which the rotor slot pitch corresponding to said first tooth on the trailing side of each pole face is also substantially equal to twice the pitch of the stator slots.

3. A dynamoelectric machine as defined in claim 1 in which the rotor slot pitch corresponding to said first tooth on the trailing side of each pole face is between 1.4 and 3.4 times the pitch of the stator slots.

* * * * *